Figure 1:
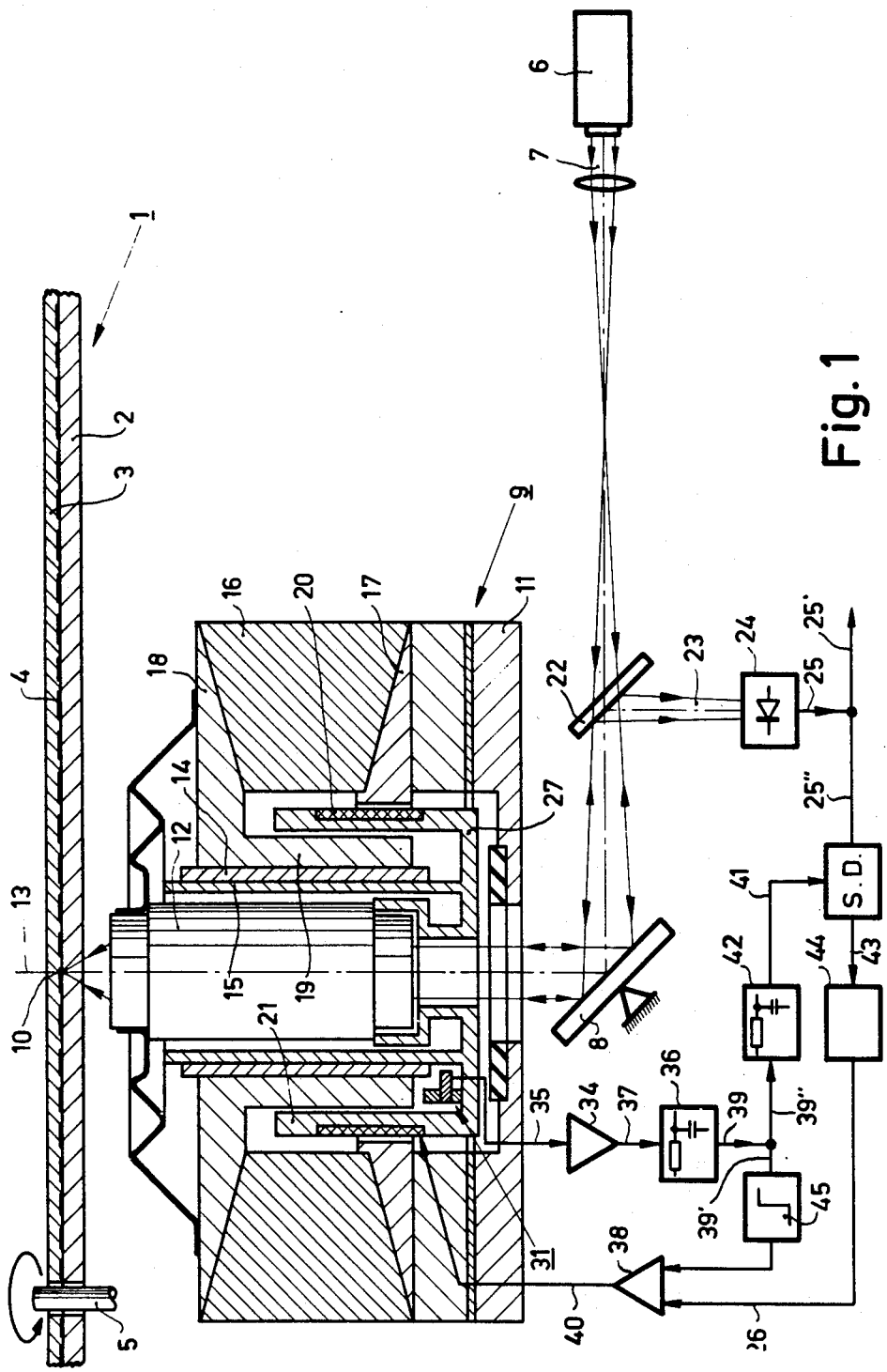

United States Patent [19]

van Rosmalen

[11] 4,032,776
[45] June 28, 1977

[54] AUTOMATIC OPTICAL FOCUSSING SYSTEM

[75] Inventor: Gerard Eduard van Rosmalen, Eindhoven, Netherlands

[73] Assignee: U.S. Philips Corporation, New York, N.Y.

[22] Filed: Feb. 23, 1976

[21] Appl. No.: 660,659

[30] Foreign Application Priority Data

Jan. 16, 1976 Netherlands .................. 7600423

[52] U.S. Cl. ............................... 250/201; 358/128
[51] Int. Cl.² ..................................... G01J 1/20
[58] Field of Search ........... 250/201, 204, 234–236; 179/100.3 V; 178/6.6 R, 6.6 DD

[56] References Cited
UNITED STATES PATENTS

| | | | |
|---|---|---|---|
| 3,418,478 | 12/1968 | Falbel | 250/201 |
| 3,932,700 | 1/1976 | Snopko | 179/100.3 V |
| 3,946,166 | 3/1976 | Wossidlo | 179/100.3 V |
| 3,952,191 | 4/1976 | Tinet | 178/6.6 DD |
| 3,967,110 | 6/1976 | Rodgers et al. | 250/234 |

Primary Examiner—David C. Nelms
Attorney, Agent, or Firm—Frank R. Trifari; Simon L. Cohen

[57] ABSTRACT

An automatic optical focussing system, suitable for a video disc player, comprising an optical focussing device with an objective which is moved to and fro at high frequency in the direction of its optical axis by electrodynamic drive means, the superimposed high frequency component of the signal which has been modulated by the information tracks on the video disc being employed for automatic control of the position of the objective. In view of a low power consumption the objective is connected to an oscillation-compensation element by means of at least one resilient element, for example a circular plate, which compensation element is axially movable or relative thereto, and which together with the objective and the resilient element constitutes a mechanical resonant system. On the resonant system a piezo-electric acceleration transducer may be mounted with the aid of which the mechanical resonant system can be included in a self-oscillating loop.

8 Claims, 3 Drawing Figures

AUTOMATIC OPTICAL FOCUSSING SYSTEM

The invention relates to an automatic optical focussing system for an apparatus for reading an information track on a record carrier with the aid of a read spot which is focussed in an imaginary focussing plane and which is formed by a radiation beam produced by a radiation source, more in particular for a video disc player which employs optical reading, and serving for automatically keeping the read spot focussed at the plane in which the information track is located (information plane) while a record carrier is being played, and comprising: an optical focussing device for focussing the radiation beam to a read spot in the imaginary focussing plane and comprising a frame, an electrically controllable objective provided with lenses which is axially movable relative to the frame in the direction of its optical axis for varying the position of the focussing plane, bearing means for mounting the objective so as to be movable relative to the frame, as well as electrodynamic drive means which comprise at least one control coil for controlling the coarse position of the focussing plane and means for causing the high-frequency oscillation of the objective in an axial direction, so that a high frequency oscillation about the coarse position of the focussing plane is obtained, a radiation detector which responds to the reflected radiation beam, which has been modulated by the information track for producing a detection signal depending on the position of the focussing plane relative to the information plane, and a control circuit for producing a control signal which depends on the detection signal, which control signal is applied to the control coil of the optical focussing device.

Optically operating video disc players generally comprise two important servo-systems, which serve to enable the information track on the video disc to be read with the optical system in spite of continual deviations in the position of the track. These two servo systems are constituted by an automatic tracking system with the aid of which the information track can be followed radially, and sometimes also tangentially, and an automatic focussing system which serves to insure that the focussing plane constantly coincides with the information plane as far as possible.

An automatic optical focussing system of the type mentioned in the preamble has been proposed previously. It bears great resemblance to an automatic tracking system as described in the article "Ein Bildplattensystem mit Laseraufzeichnung", Funkschau 1974, Heft 25, 3041–3044. In this known device the radiation beam is focussed at the information track of a video disc with the aid of a tracking mirror device and a number of optical elements. The radiation beam which is modulated by the information on the disc is subsequently read with the aid of a photodiode, i.e. the photodiode converts the modulation of the light intensity of the radiation beam into a voltage modulation, which is applied to appropriate electronic means for obtaining a suitable video and audio signal. The output signal of the photodiode is also used for tracking control, which as previously stated, serves to keep the read spot of the radiation beam constantly aimed at the information track. The oscillating mirror, which reflects the radiation beam from the light source before it reaches the video disc, gives the read spot small periodic excursions in a direction transverse to the information track. These high frequency movements of the read spot results in high-frequency variations of low amplitude of the light intensity of the modulated radiation beam which is picked up by the photodiode. The amplitude of these high frequency light variations and their phase relationship with the oscillatory motion of the oscillating mirror provide information about the degree and the direction of the deviation from the desired coarse position of the read spot. This information is obtained electronically by means of a so-called synchronous detection device, which consists of a phase-sensitive rectifier, which produces a signal which is applied to the tracking mirror for re-adjusting the tracking mirror so as to correct the coarse position of the read spot relative to the information track. The oscillating mirror is disposed on a piezo-ceramic resonator which is driven by means of an oscillator with a fixed frequency. The oscillator signal, which has a frequency of approximately 20 kHz, is also applied to the synchronous detection device for detection of the phase-relationship between the oscillator signal and the high-frequency component of the output signal from the photodiode. The Applicant's copending patent application Ser. No. 660,498 filed Feb. 23, 1976 also describes a tracking device of this type, but in this device the oscillating mirror resonates and is included in a self-oscillating loop with an oscillating frequency of approximately 30 kHz. In said previously proposed automatic optical focussing system the electrically controllable objective is moved to to and fro with a high frequency in the direction of its optical axis and thus substantially perpendicular to the information plane. For this purpose a high frequency voltage is also applied to the control coil which serves for controlling the coarse position of the focussing plane. In a similar way described hereinbefore the high frequency oscillation of the focussing plane about its coarse position, results in a signal which can be applied to the control coil for controlling the coarse position of the objective.

Such an automatic optical focussing system demands a comparatively large amount of energy. This is owing to the fact that the objective, together with the parts which are connected thereto, such as the control coil, has a comparatively large mass, while moreover, at the location of the bearing arrangement of the objective relative to the frame, comparatively high friction losses occur. Moreover, undesired damping losses occur in the bearing arrangement. It is an object of the invention to improve this and the invention is characterized in that by means of at least one resilient element the objective is connected to an oscillation-compensation element which is axially movable relative to the objective, the objective together with the oscillation compensation element and the resilient element(s) constituting a mechanical resonant system which oscillates with a high frequency.

By utilizing the resonance of a resonant system an oscillating system with a high efficiency is obtained.

In an optical focussing system in which the bearing means of the objective comprises a part of a plain bearing which is stationary connected to the frame and a movable part which is connected to the objective, it is advantageous to use an embodiment of the invention which is characterized in that the movable part of the plain bearing is connected to the resilient element(s) substantially at the location of a neutral zone of the resilient element, i.e. a zone where the amplitude of the high-frequency oscillatory motion is substantially zero.

This embodiment has the advantage that the two parts of the plain bearing belonging to the bearing arrangement do not oscillate at high frequency relative to each other, so that no friction and damping losses occur in the bearing. It is of advantage if the electrodynamic drive means form part of the oscillation compensation element. The mass of these parts may thus have a useful additional function.

A practical embodiment of the invention is characterized in that the resilient element comprises a circular plate which can effect high frequency bending vibrations between a slightly concave and a slightly convex position, the neutral zone being annular and being situated between the center and the circumference of the plate, the oscillation-compensation element substantially consists of a hollow cylinder which carries the movable electrodynamic drive means, which cylinder is concentrically connected to the resilient plate near the circumference. The movable part of the plain bearing consists of a hollow cylindrical bearing bush, which is concentrically connected to the resilient plate near the neutral zone, and the objective is concentrically connected to the resilient plate near the center. The shape of the circular plate is well in accordance with the objective and the commonly used round control coils for such focussing systems.

Preferably, in order to reduce or avoid the damping to which the oscillation-compensation element might be subjected in the magnetic field of the electrodynamic drive means, at least one of the following steps is also employed:

a. a division of the oscillation-compensation element into several parts which are separated from each other by electrically insulating zones, b. manufacturing the oscillation-compensation element at least partly from an electrically insulating material.

The purpose of these steps is to minimize or prevent eddy currents in the oscillation compensation element.

For the inclusion of the optical focussing system in a self-oscillating loop the following embodiment is of importance, which is characterized in that on one of the parts of the mechanical resonant system which oscillates at high frequency; an electrical acceleration transducer is mounted which is electrically connected to the input of the amplifier whose output in its turn is electrically connected to the drive coil of the resonant system. Suitably, an acceleration transducer may be used for this purpose, which consists of a piezo-electric crystal, which is secured to the mechanical resonant system, and an auxiliary mass which is mounted on the crystal.

Figure 2:
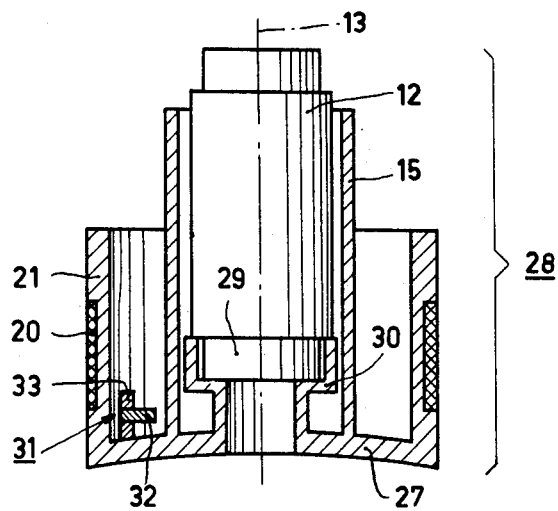
Figure 3:
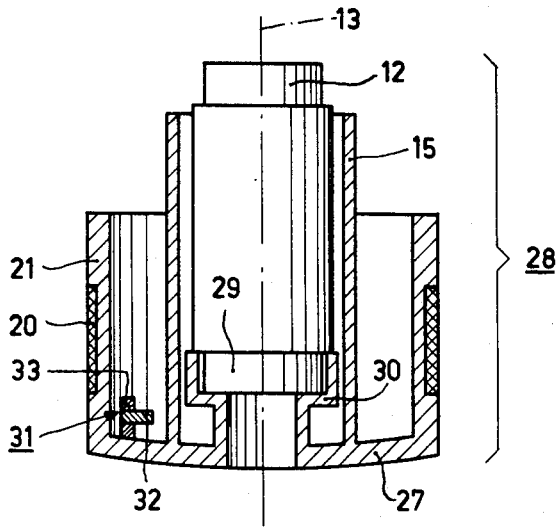

The invention will be described in more detail with reference to the drawing, in which:

FIG. 1 shows a diagram of an automatic optical focussing system in accordance with the invention, an optical focussing device belonging to the focussing system being also shown in cross-section, FIG. 2 in cross-section shows the mechanical resonant system belonging to the optical focussing device of FIG. 1, the position of the various components of the resonance system relative to each other at the instant that one of the limits of the resonance vibration is reached being shown on a highly exaggerated scale for the sake of clarity, and FIG. 3 again shows the resonant system of FIG. 2, the mutual position of the components of the resonant system relative to each other for the other limit of the resonance vibration being shown again on an exaggerated scale.

The automatic optical focussing system shown in FIG. 1 belongs to a video disc player of the type previously described in the article "The Philips VLP-system", Philips Technical Review 33, 178–193, 1973, No. 7 (herewith incorporated by reference). The video disc used in this system, which disc is designated by the reference numeral 1 in FIG. 1, consists of a transparent PVC layer 2 on which a protective coating 3 is disposed. At the plane separating these two layers a surface 4 containing video plus audio information is disposed on which a surface very thin reflecting metal layer, not shown, is vacuum-deposited. The video disc is driven by means of a drive spindle 5 with a speed of 1500 or 1800 revolutions per minute, depending on the line frequency which is 50 or 60 Hz. The radiation source 6 which is used is a laser which produces a light beam 7. This light beam is led to the optical focussing device 9 via a pivotable mirror 8, so that the beam is focussed to a read spot 10 which is situated in the focussing plane of the focussing device. The purpose of the automatic focussing system is to ensure that the focussing plane always coincides with the information plane, roughly coinciding with the surface 4, as far as possible. The function of the pivotable mirror 8 will not be discussed in more detail the scope of this Patent Application, for this see the previously mentioned article. In this respect it is to be noted morely that this pivotable mirror performs a function in a second control circuit which serves to keep the read spot always aimed at a track in the case of radial deviations from the information track.

The optical focussing device 9 comprises a frame 11 and an objective 12. In this respect "frame" is to be understood to mean the assembly of parts which is not connected to the axially movable objective 12. This objective comprises a number of lenses, not shown, which are of no further significance for the invention. The optical axis of the objective is represented by a dash-dot line and bears the reference numeral 13. The movements of the objective 12 take place in the direction of this optical axis and serve to enable the read spot 10 and thus the focussing plane to be moved in the direction of the optical axis 13. The bearing means, for mounting the objective so as to be movable relative to the frame, comprise a bearing bush 14 which is rigidly connected to the frame and a bearing bush 15 which is connected to the objective. The frame comprises an annular axially magnetized permanent magnet 16 on which at one side a soft-iron closing plate 17 is mounted. At the other side a second component 18 is disposed which is constituted by a closing plate and an adjoining cylindrical portion which extends to the closing plate 17 in which the bearing bush 14 is fixed. This cylindrical portion is designated by the reference numeral 19. The closing plate 17 has a central round opening in which the cylindrical portion 19 extends. Thus, an air gap is obtained between the end of the cylindrical portion 19 and the closing plate 17, in which gap a control coil 20 is located which is mounted on a coil base 21. The control coil 20 and the permanent magnet 16 belong to the electrodynamic drive means for controlling the coarse position of the objective 12 and thus of the focussing plane. By applying a high-frequency voltage to the control coil 20 a high-frequency oscillation is imparted to the objective 12. The embodiment of the optical focussing device shown in FIG. 1 is a modification of a focussing device which has been previously described in the applicant's copending Patent application Ser. No. 568,623, filed April 16, 1975. For further information relating to the focussing device shown as well as alternative embodiments reference is made to this previous Application (herewith incorporated by reference).

The reflecting layer at the location of the surface 4 reflects the light beam which is projected on the video disc and this beam is returned through objective 12 and via the pivoting mirror 8 in the direction of a second semi-transparent mirror 22 which is disposed in the path of the light beam 7. This mirror reflects the reflected light beam 23 in the direction of a radiation detector 24 which consists of a light-sensitive diode. The output signal, which is denoted by the arrow 25, is split into two output signals 25' and 25''. The output signal 25' is applied to suitable electronic means for processing the audio and video information contained in the signal. The output signal 25'' serves as a detection signal and depends on the position of the focussing plane relative to the information plane, the positioned information being contained in a high frequency amplitude modulated component of the output signal. This detection signal is applied to a control circuit for producing a control signal 26 which is applied to the control coil 20 for correcting the position of the focussing plane.

Before the control circuit will be discussed in more detail, the characterizing feature of the construction of the optical focussing device will be discussed. The previously mentioned coil base 21 is connected to the objective 12 by means of a resilient element 27 and in addition to coil base it also functions as oscillation-compensation element. Owing to the elasticity of the resilient element 27 the oscillation-compensation element is axially movable relative to the objective 12 and together with the objective and the resilient element it constitutes a mechanical resonant system which oscillates at a high frequency. The mechanical resonant system is denoted by the general reference numeral 28 in FIGS. 2 and 3. The movable part 15 of the plain bearing is connected to the resilient element 27 substantially at the location of a neutral zone of the resilient element, i.e. a zone where the amplitude of the high-frequency oscillatory motion is substantially zero. The resilient element 27 consists of a circular plate which can effect high-frequency bending vibrations between a slightly concave shape, shown in FIG. 3, and a slightly convex shape, shown in FIG. 2, the neutral zone being annular and being disposed between the center and the circumference of the plate. This annular neutral zone coincides with the base of the movable part 15 of the plain bearing. The control coil 20 forms part of the mass of the oscillation-compensation element 21, which as previously stated is annular and which furthermore is secured to the resilient plate 27 concentrically relative to the objective 12 and the bearing element 15. By means of a threaded portion 29 the objective 12 is connected to the resilient plate 27 near the center thereof. In the embodiment of the resonant system shown in the Figure the oscillation-compensation element 21, the resilient plate 27, the bearing bush 15, as well as the portion 30 which co-operates with the threaded portion 29 of the objective 12, to be called objective holder hereinafter, are integral. It is obvious that this is not necessary and that the resonant system may consist of several parts which are rigidly connected to each other. It is in fact almost impossible to make the objective holder 30, in accordance with the drawing, integral with the resilient plate 27 and this holder will preferably consist of a separate component, which is connected to the resilient plate 27, for example by soldering, screwing or gluing.

The resonant system has been designed so that the objective 12 can effect a high frequency oscillation in the direction of its optical axis 13 with an oscillation frequency which is of the order of 30 kHz. In this respect it is of advantage in order to avoid damping in the magnetic field of the permanent magnet 16 owing to the occurrence of eddy currents, that the oscillation-compensation element 21 either takes the form of separate component made of an electrical non-conductive material such as a plastic, or of several parts which are separated from each other by means of electrically insulating zones, such as serrations. As these embodiments will present no problems to those skilled in the art, they are not shown in the drawing.

On the resilient plate 27 nearer its outer circumference, an electrical acceleration transducer 31 is mounted whose function will be explained in the part of the description relating to the control circuit. It comprises a piezo-electric crystal 32, which is fixed to the resilient plate 27 for example by gluing, as well as an auxiliary mass 33 mounted thereon, which may for example consist on a block of brass which is glued onto the crystal. During the high-frequency oscillation the block will produce tensile and compressive stresses in the piezo-crystal 32, so that electrical voltages are produced which are proportional to the acceleration of the brass block 33 and thus to the locally prevailing acceleration in the resonant system 28.

With the aid of the electrical acceleration transducer 31, the mechanical resonant system 28 is included in a self-oscillating loop. In addition to the mechanical resonant system 28, said loop, as previously stated, includes the piezo-electric acceleration transducer 31 and further an amplifier 34 to which the output signal 35 of the acceleration transducer is applied, a phase-shifting network 36, which receives the output signal 37 of the amplifier 34, an amplitude-limiting network 45, as well as an amplifier 38. The output signal 39 of the phase-shifting network 36 is divided into two output signals 39' and 39'', the signal 39' being applied to the amplifier 38 via the amplitude-limiting network 45. The output signal 40 of this amplifier is fed to the control coil 20. The oscillations of the mechanical resonant system 28 are converted into electrical oscillations by the piezo-electric acceleration 31 which by an appropriate phase shift and amplitude correction, provided by the phase shifting network 36 and the amplitude limiting network 45, and after application to the control coil 20 ensure that the control coil receives the correct high-frequency signal to sustain the high-frequency oscillation. The prevailing oscillation frequency equals the resonant frequency of the mechanical resonant system 28 and the power required to sustain the oscillation merely serves to counteract the losses occurring during the oscillation.

The control system for controlling the coarse position of the focussing plane of the objective 12 and thus the position of the objective 12 itself comprises a synchronous detector which in FIG. 1 is designated SD and which consists of a phase-sensitive rectifier. Said detector receives two signals 25'' and 41, of which the first signal, as previously stated, is obtained from the photodiode 24 and the second signal from a second phase-shifting network 42 to which the output signal 39" of the phase shifting network 36 is applied. The synchronous detector, in the previously mentioned known manner, supplies an output signal 43 which in respect of its amplitude depends on the amplitude of the output signal 25" of the photo diode 24 and in respect of its polarity, which may be positive or negative, depends on the phase relationship between the high-frequency components of the signals 41 and 25". The output signal 43 of the synchronous detectors passes through an electronic controller 44, after which it is applied to the amplifier 38 in the form of a control signal 26, which amplifier 38 takes the form of a summing amplifier which sums the two signals 26 and 39'. The output signal 40 of the summing amplifier 38 thus contains both a signal for controlling the coarse position of the objective 12 and a high frequency signal for sustaining the high-frequency resonance vibration of the mechanical resonant system 28.

What is claimed is:

1. An automatic optical focussing system for an apparatus for reading an information track on an information plane of a reflecting record carrier of the type comprising a radiation source means for providing a radiation beam
    an optical focussing device for focussing the radiation beam to a read spot in a focussing plane and comprising a frame, an electrically controllable objective means provided with lenses which is axially movable relative to the frame in the direction of its optical axis for varying the position of the focussing plane, bearing means for mounting the objective so as to be movable relative to the frame, and electrodynamic drive means comprising at least one control coil for controlling the coarse position of the focussing plane, and means for causing the objective to oscillate at a high frequency in an axial direction, so that a high frequency oscillation about the coarse position of focussing plane is obtained,
    a radiation detection responsive to the radiation beam, which has been modulated and reflected by the information track, for producing a detection signal depending on the position of the focussing plane relative to the information plane and
    a control circuit means for producing a control signal which depends on the detection signal and for applying said control signal to the control coil of the optical focussing device,
    the improvement comprising at least one resilient element connecting the objective to an oscillation-compensation element which is axially movable relative to the objective, the objective together with the oscillation-compensation element and the resilient element constituting a mechanical resonant system which oscillates with a high frequency.

2. An optical focussing system as claimed in claim 1, the bearing means of the objective comprising a part of a plain bearing which is stationarily connected to the frame and a part which is movably connected to the objective, wherein
    the movable part of the plain bearing is connected to the resilient element substantially at the location of a neutral zone of the resilient element where the amplitude of the high-frequency oscillatory motion is substantially zero.

3. An optical focussing system as claimed in claim 1, wherein the electrodynamic drive means forms part of the oscillation compensation element.

4. An optical focussing device as claimed in claim 2 and, wherein
    the resilient element consists of an annular plate which can effect high-frequency bending vibrations between a slightly concave and a slightly convex position, the neutral zone being annular and being disposed between the center and the circumference of the plate,
    the oscillation-compensation element substantially consisting of a hollow cylinder which carries the movable electrodynamic drive means, which cylinder is concentrically connected to the resilient plate near the circumference,
    the movable part of the plain bearing consists of a hollow cylindrical bearing bush which is concentrically connected to the resilient plate proximate the neutral zone, and
    the objective is concentrically connected to the resilient plate proximate the center.

5. An optical focussing system as claimed in claim 3, wherein in order to reduce the damping to which the oscillation-compensation element is subjected in the magnetic field of the electrodynamic drive means,
    the oscillation compensation element comprises several parts separated from each other by electrically insulating zones.

6. An optical focussing system as claimed in claim 1, wherein an electrical accelerating transducer is mounted on the mechanical resonant system, said transducer being electrically connected to the input of an amplifier whose output in its turn is electrically connected to the drive coil of the resonant system.

7. An optical focussing system as claimed in claim 6, wherein the acceleration transducer comprises a piezoelectric crystal which is secured to the mechanical resonant system, and an auxiliary mass which is mounted on the crystal.

8. An optical focussing system as claimed in claim 3, wherein in order to reduce the damping to which the oscillation-compensation element is subjected in the magnetic field of the electrodynamic drive means, said oscillation-compensation element comprises electrically insulating material.

* * * * *